(12) United States Patent
Baba et al.

(10) Patent No.: US 9,176,985 B2
(45) Date of Patent: Nov. 3, 2015

(54) APPARATUS AND METHOD FOR RETRIEVING IMAGE

(75) Inventors: Takayuki Baba, Kawasaki (JP); Masaki Ishihara, Kawasaki (JP); Susumu Endo, Kawasaki (JP); Shuichi Shiitani, Kawasaki (JP); Yusuke Uehara, Tokyo (JP); Daiki Masumoto, Kawasaki (JP); Shigemi Nagata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 668 days.

(21) Appl. No.: 12/635,515

(22) Filed: Dec. 10, 2009

(65) Prior Publication Data

US 2010/0153449 A1 Jun. 17, 2010

(30) Foreign Application Priority Data

Dec. 16, 2008 (JP) ................................. 2008-319977

(51) Int. Cl.
*G06F 17/30* (2006.01)

(52) U.S. Cl.
CPC .............. *G06F 17/30247* (2013.01)

(58) Field of Classification Search
CPC ............................................... G06F 17/30017
USPC .......................................... 707/769, 770, 780
See application file for complete search history.

(56) References Cited

U.S. PATENT DOCUMENTS

| | | | |
|---|---|---|---|
| 5,638,465 A * | 6/1997 | Sano et al. ..................... | 382/281 |
| 6,677,944 B1 * | 1/2004 | Yamamoto .................... | 345/422 |
| 6,826,316 B2 * | 11/2004 | Luo et al. ...................... | 382/305 |
| 7,587,082 B1 * | 9/2009 | Rudin et al. .................. | 382/154 |
| 2004/0103093 A1 * | 5/2004 | Furuhashi et al. ................ | 707/3 |
| 2007/0216773 A1 * | 9/2007 | Kojima et al. ............. | 348/207.1 |
| 2010/0076959 A1 * | 3/2010 | Ramani et al. ................ | 707/722 |

FOREIGN PATENT DOCUMENTS

| | | |
|---|---|---|
| JP | 2002-288690 A | 10/2002 |
| JP | 2004-164503 A | 6/2004 |

OTHER PUBLICATIONS

"Shape based 3D model retrieval without query" by Susumu Endo, Copyright 2007 ACM 978-1-59593-733-Sep. 7, 0007.*
"Searching One Billion Web Images by content: Challenges and Opportunities," Zhiwei Li, MS Research Asia, pp. 33-37, 2007.*
"An application of Multiple Viewpoints to Content-Based Image Retrieval," James C. French, 2003.*

(Continued)

*Primary Examiner* — Tony Mahmoudi
*Assistant Examiner* — Mohammad Rahman
(74) *Attorney, Agent, or Firm* — Maschoff Brennan

(57) ABSTRACT

An image retrieval method includes reading from a first database a first image group mapped to an object as a retrieval target, and extracting an image feature quantity of a plurality of images of the first image group. A second image group mapped to an object as a search key is read from a second database and an image feature quantity of a plurality of images of the second image group is extracted. Similarity is determined between the first image group and the second image group, based on the image feature quantity of the plurality of images of the first image group and the image feature quantity of the plurality of images of the second image group. On an output device, as retrieval results, the plurality of images of the first image group are displayed in order of similarity of the object as the retrieval target based on determined similarity.

15 Claims, 17 Drawing Sheets

(56) References Cited

OTHER PUBLICATIONS

T. Baba, et al., "A shape-based part retrieval method for mechanical assembly drawings", Mar. 17, 2005, pp. 79-84, Technical Report of IEICE, PRMU2004-225.

T. Baba, et al., "Similarity-based Partial Image Retrieval System for Engineering Drawings", Dec. 14, 2005, pp. 303-309, Proc. of Seventh IEEE International Symposium on Multimedia (ISM2005).

S.Endo,et al. "MIRACLES: Multimedia Information Retrieval, Classification, and Exploration System", (2002), ICME2002, proceedings of ICME2002.

S.Endo,et al. "Shape based 3D model retrieval without query". pp. 218-225, Jul. 2007, Proc. of ACM International Conference on Image and Video Retrieval (CIVR2007).

T. Baba, et al. "An Interactive Image Mining System for Engineering Design and Manufacture", Oct. 28, 2007, Proc. of Workshop on Knowledge Management and Semantic Web for Engineering Design (KW4ED) in conjunction with ACM K-CAP 2007 (The Fourth International Conference on Knowledge Capture).

Y. Wang, et al. "An Images Based 3D Model Retrieval Approach", Jan. (2008), Proc. of the 14th the International MultiMedia Modeling Conference.

\* cited by examiner

FIG. 4

| ID OF TARGET SERVING AS SEARCH KEY | IMAGE FILE NAME | ORIENTATION OF PLANE |
|---|---|---|
| Object_000 | 000_heimen.jpg | PLAN VIEW |
| Object_000 | 000_teimen.jpg | BOTTOM VIEW |
| Object_000 | 000_syoumen.jpg | FRONT VIEW |
| Object_000 | 000_haimen.jpg | REAR VIEW |
| Object_000 | 000_migisokumen.jpg | RIGHT-SIDE VIEW |
| Object_000 | 000_hidarisokumen.jpg | LEFT-SIDE VIEW |
| Object_000 | 000_daihyo.jpg | — |
| Object_000 | 000_naname | — |

FIG. 5

| ID OF TARGET SERVING AS SEARCH KEY | IMAGE FILE NAME | ORIENTATION OF PLANE |
|---|---|---|
| Object_#1 | #1_heimen.jpg | PLAN VIEW |
| Object_#1 | #1_teimen.jpg | BOTTOM VIEW |
| Object_#1 | #1_syoumen.jpg | FRONT VIEW |
| Object_#1 | #1_haimen.jpg | REAR VIEW |
| Object_#1 | #1_migisokumen.jpg | RIGHT-SIDE VIEW |
| Object_#1 | #1_hidarisokumen.jpg | LEFT-SIDE VIEW |
| Object_#1 | #1_naname.jpg | — |
| ⋮ | ⋮ | ⋮ |
| Object_#n | #n_heimen.jpg | PLAN VIEW |
| Object_#n | #n_teimen.jpg | BOTTOM VIEW |
| Object_#n | #n_syoumen.jpg | FRONT VIEW |
| Object_#n | #n_haimen.jpg | REAR VIEW |
| Object_#n | #n_migisokumen.jpg | RIGHT-SIDE VIEW |
| Object_#n | #n_hidarisokumen.jpg | LEFT-SIDE VIEW |
| Object_#n | #n_naname.jpg | — |

APPARATUS AND METHOD FOR RETRIEVING IMAGE

CROSS-REFERENCE TO RELATED APPLICATION

This application is based upon and claims the benefit of priority of the prior Japanese Patent Application No. 2008-319977, filed on Dec. 16, 2008, the entire contents of which are incorporated herein by reference.

FIELD

Embodiments discussed herein are related to a method and apparatus for retrieving similar objects.

BACKGROUND

Techniques for retrieving similar objects are applied in a variety of fields such as industrial design retrieval in design examinations, product image retrieval in design and manufacture, 3-dimensional computer aided design (3D-CAD), and drawing search in component images. The industrial design retrieval in design examinations is described below.

In the design examination, existing designs similar to a design of a verification target are retrieved to determine design similarity. In the industrial design image retrieval in the design examination, an existing design and a text describing the feature of that existing design are stored on a database (DB) with the design tied to the text. The database is then searched with a keyword as a search key representing the feature of the design as the verification target. The existing design similar to the design as the verification target is thus retrieved.

Japanese Unexamined Patent Application Publication No. 2004-164503 discloses a three-dimensional model retrieval method as a typical image retrieval application. In accordance with the disclosure, a three-dimensional model similarity retrieval is performed with a two-dimensional image as a search key. Japanese Unexamined Patent Application Publication No. 2002-288690 discloses a cubical image display method displaying an image on a cube in the typical image processing.

SUMMARY

According to an aspect of the invention, an image retrieval method of a computer for retrieving similar objects includes reading from a first database an image group mapped to an object as a retrieval target, and extracting an image feature quantity of a plurality of images of the read image group, the first database storing the object as the retrieval target and the image group including the plurality of images resulting from depicting the object as the retrieval target from viewpoints in different directions, with the object as the retrieval target mapped to the image group.

According to the aspect, the image retrieval method further includes reading from a second database an image group mapped to an object as a search key and extracting an image feature quantity of a plurality of images of the read image group, the second database storing the object as the search key and the image group including the plurality of images resulting from depicting the object as the search key from viewpoints in different directions, with the object as the search key mapped to the image group.

According to the aspect, the image retrieval method further includes determining a similarity between the image group mapped to the object as the search key and the image group mapped to the object as the retrieval target, based on the image feature quantity of the plurality of images of the image group mapped to the object as the retrieval target and the image feature quantity of the plurality of images of the image group mapped to the object as the search key.

According to the aspect, the image retrieval method further includes displaying, on an output device, as retrieval results the plurality of images of the image group mapped to the object as the retrieval target in the order of similarity of the object as the retrieval target based on the determined similarity.

The object and advantages of the invention will be realized and achieved by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a data table of a key image group.

FIG. 5 is a data table of retrieval target image groups.

DESCRIPTION OF EMBODIMENTS

An industrial design retrieval performed in a design examination is described below with reference to an embodiment and drawings. The embodiment is described below for exemplary purposes and the invention is not limited to the industrial design retrieval. The invention is applicable not only to the industrial design search but also to other image retrieval applications.

A typical image retrieval method in the design examination, such as a three-dimensional model retrieval using a two-dimensional image as a search key, may be considered. It is contemplated that six images (on six-pane images) may be used for each of a design as a verification target and an existing design (hereinafter simply referred to as an object). The design as a verification target is used as a search key, and the design (existing design) as a retrieval target is searched and retrieved according to the search key. Since each of the verification target design and the retrieval target design includes six images, some ingenuity may be used in image retrieval as described hereinbelow.

Figure 1:
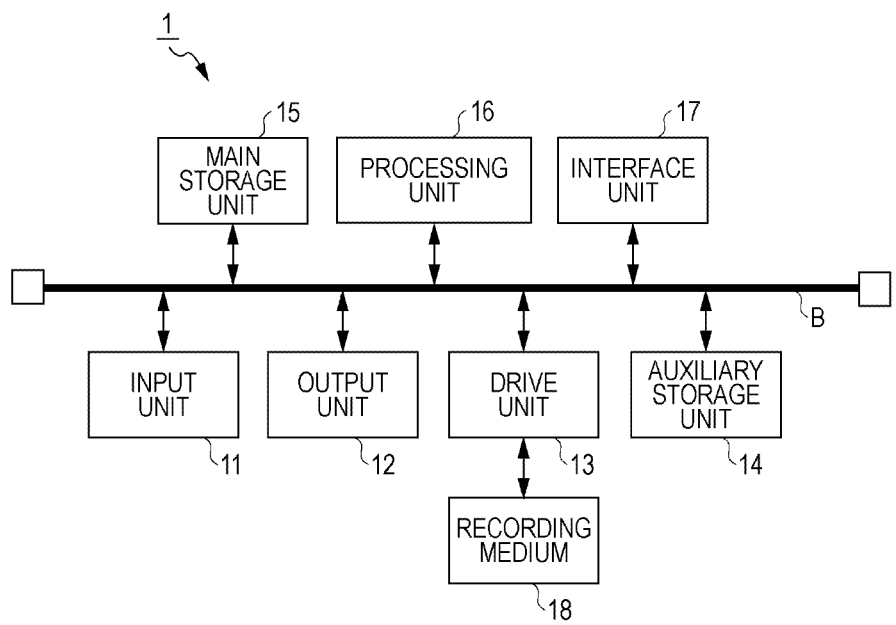
FIG. 1 illustrates a hardware structure of a design image retrieval apparatus.

FIG. 1 illustrates a hardware structure of a design image retrieval apparatus 1 according to an embodiment. The design image retrieval apparatus 1 includes input unit 11, output unit 12, drive unit 13, auxiliary storage unit 14, main storage unit 15, processing unit 16, and interface unit 17, these elements mutually connected to each other via a bus B.

The input unit 11, which may include a keyboard and/or a mouse, for example, is used to input a variety of signals. The output unit 12, which may include a display device, for instance, displays a variety of windows and data. The interface unit 17, which may include a modem and/or a local area network (LAN) card, is used to connect the design image retrieval apparatus 1 to a network such as the Internet.

A design image retrieval program of the embodiment is at least one of the variety of programs controlling the design image retrieval apparatus 1. The design image retrieval program may be supplied in a recording medium 18 or may be downloaded via the network. The recording medium 18 storing the design image retrieval program may be a recording medium configured to optically or electronically record information, such as a compact disk read-only memory (CD-ROM), a flexible disk, or a magnetooptical disk. The recording medium 18 may alternately or additionally be a semiconductor memory configured to electrically record information, such as a ROM or a flash memory.

Recording medium 18 and the foregoing examples of structures and devices that can be used as the recording medium 18 are examples of a computer-readable storage medium that stores a program causing a computer to perform processes of retrieving similar objects discussed herein, such as the design image retrieval program.

If the recording medium 18 storing the design image retrieval program is loaded onto the drive unit 13, the design image retrieval program can be installed onto the auxiliary storage unit 14 from the recording medium 18 via the drive unit 13. Alternately, the design image retrieval program may be downloaded via the network and installed onto the auxiliary storage unit 14 via the interface unit 17. Thus, a computer-readable storage medium that stores a program causing a computer to perform processes of retrieving similar objects can be remote with respect to design image retrieval apparatus and accessed via the network. The auxiliary storage unit 14 may be a hard disk drive (HDD).

The auxiliary storage unit 14 stores not only the design image retrieval program but also can store related files and/or data. At the startup of the computer, the main storage unit 15 reads the design image retrieval program from the auxiliary storage unit 14 and stores the design image retrieval program on the main storage unit 15. The processing unit 16 performs a variety of processes to be discussed hereinbelow in accordance with the design image retrieval program stored on the main storage unit 15.

The design image retrieval apparatus 1 may be used as a standalone apparatus. It is also contemplated that the design image retrieval apparatus 1 can be used in a network system illustrated in FIG. 2, such as a client-server system (CSS).

Figure 2:
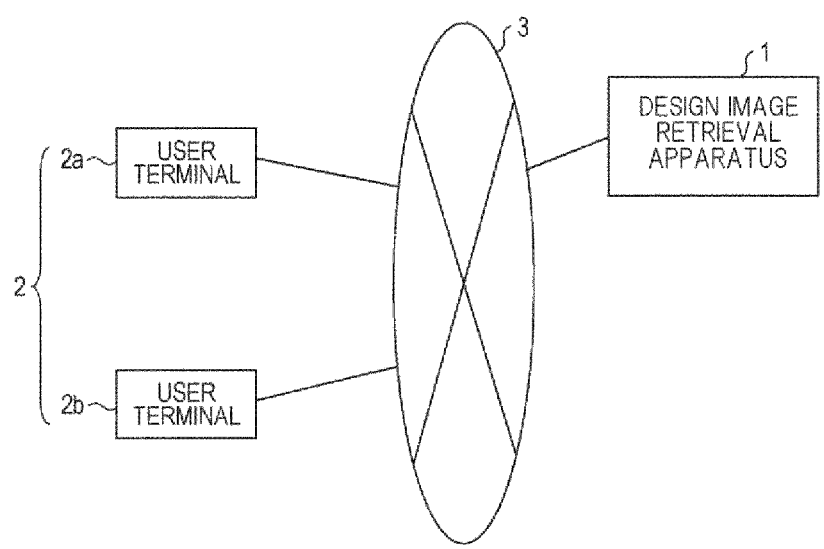
FIG. 2 illustrates a design image retrieval system including the design image retrieval apparatus.

FIG. 2 illustrates a design image search system including the design image retrieval apparatus 1.

In the design image search system of FIG. 2, the design image retrieval apparatus 1 is connected to at least one user terminal 2 via a network 3 such as the Internet. In FIG. 2, the at least one user terminal is illustrated as including user terminal 2a and user terminal 2b, and will hereinafter be referred to as "user terminal 2." The user terminal 2 is operated by a user who searches for design images. The user terminal 2 transmits a request to the design image retrieval apparatus 1 and receives a response from the design image retrieval apparatus 1. The design image retrieval apparatus 1 illustrated in FIG. 2 may be identical in structure to the design image retrieval apparatus 1 illustrated in FIG. 1.

Figure 3:
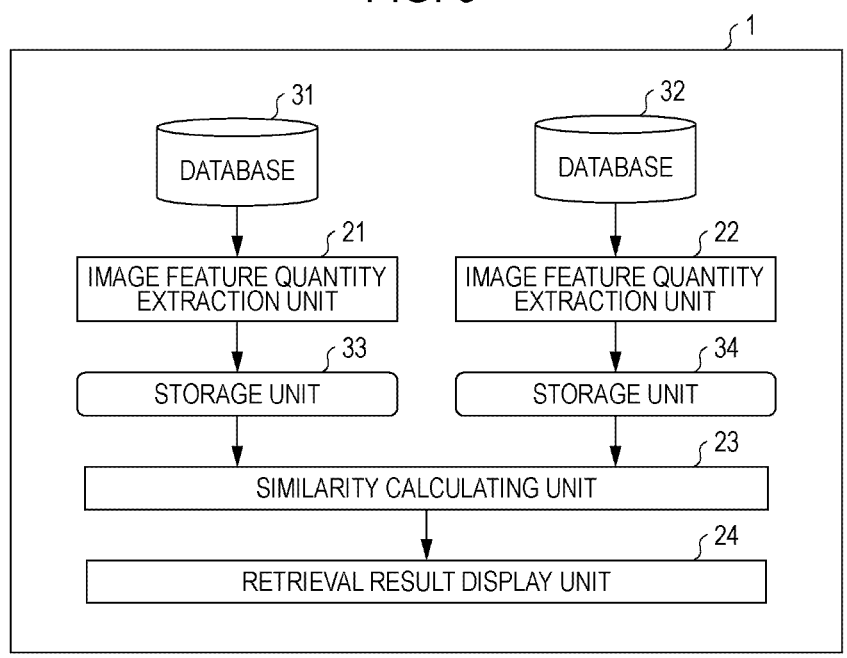
FIG. 3 is a block diagram of the design image retrieval apparatus.

FIG. 3 is a block diagram of the design image retrieval apparatus 1 according to an embodiment. The design image retrieval apparatus 1 includes image feature quantity extraction units 21 and 22, similarity calculating unit 23, retrieval result display unit 24, database 31 storing a key image group, database 32 storing a retrieval target image group, storage unit 33 storing an image feature quantity of a key image, and storage unit 34 storing an image feature quantity of a retrieval target image. The database 31 storing the key image group and the database 32 storing the retrieval target image group may be external to the design image retrieval apparatus 1.

FIG. 4 is a data table managing key image groups stored on the database 31. As illustrated in FIG. 4, the database 31 stores a key image group in six image files. The key image file includes a plurality of images responsive to an object as a search key. More specifically, the key image file includes a plurality of images resulting from depicting the object as the search key from viewpoints in multiple directions.

FIG. 5 is a data table managing retrieval target image groups recorded on the database 32. As illustrated in FIG. 5, the database 32 stores n retrieval target image groups in n×6 image files. The retrieval target image group includes a plurality of images responsive to the object as the retrieval target. The plurality of images result from depicting the object as the retrieval target from viewpoints in multiple directions.

Referring to FIG. 3, the image feature quantity extraction unit 21 extracts an image feature quantity such as color and shape from each image with respect to a key image group, and then records the image feature quantity on the storage unit 33. Accordingly, the image feature quantity extraction unit 21 is an example of an image feature extracting means for reading from a database 31 an image group mapped to an object as a search key and for extracting an image feature quantity of a plurality of images of the image group. The image feature quantity extraction unit 22 extracts an image feature quantity such as color and shape from each image with reference to a retrieval target image group, and then records the image feature quantity onto the storage unit 34. Accordingly, the image feature quantity extraction unit 22 is an example of an image feature extracting means for reading from the database 32 an image group mapped to an object as a retrieval target and for extracting an image feature quantity of a plurality of images of the image group.

An image feature quantity of color may be a "color histogram" representing the frequency of occurrence of color at each pixel. An image feature quantity of shape may be a "grid Fourier feature quantity". In this case, an image is partitioned into concentric circular regions, and the ratio of black pixels within each concentric region is represented by the grid Fourier feature quantity.

The image feature quantities of color and shape are multi-dimensional information and are thus represented using vectors. In some embodiments, the image feature quantity extraction units 21 and 22 may trim a background portion of an image in response to a user's manual operation, or may activate an automatic background removal operation. An image feature quantity is thus extracted from an area other than the background.

An example of a "grid Fourier feature quantity" that is suitable for use with embodiments discussed herein is detailed in a paper entitled "A shape-based part retrieval method for mechanical assembly drawings," contributed by T. Baba, R. Liu (FRDC), S. Endo, S. Shiitani, Y. Uehara, D. Masumoto, and S. Nagata, Technical Report of IEICE, PRMU 2004-225, pp. 79-84, March 2005, which is incorporated herein by reference.

The image feature quantity extraction units 21 and 22 may use a graph-based feature quantity for partial retrieval. An example of a graph-based feature quantity that is suitable for use with embodiments discussed herein is disclosed in a paper entitled "Similarity-based Partial Image Retrieval System for Engineering Drawings," contributed by T. Baba, R. Liu (FRDC), S. Endo, S. Shiitani, Y. Uehara, D. Masumoto, and S. Nagata, Proc. of Seventh IEEE International Symposium on Multimedia (ISM2005), pp. 303-309, Dec. 14, 2005, which is incorporated herein by reference.

In graph representation, a line segment representing the outline of an object is referred to as a node, and a closeness between line segments is referred to as an edge. Objects constructed of line segments having a similar structure, regardless of the presence of slight noise or a slight difference in the lengths of the line segments, may be retrieved as similar objects in graph representation.

The similarity calculating unit 23 calculates a similarity between an object as a retrieval target and an object as a search key, based on image feature quantities of images responsive to the object as the retrieval target and the object as the search key. Accordingly, the similarity calculating unit 23 is an example of a similarity calculating means for calculating a similarity between an image group mapped to the object as a search key and an image group mapped to the object as the retrieval target. According to an embodiment, the image feature quantity extraction units 21 and 22 represent the images by the feature quantities in vector, and the similarity calculating unit 23 calculates the similarity between the images using Euclidean distance. The shorter the Euclidean distance, the higher the similarity.

Several different methods are available to determine similarity between objects. In one method, the mean value of the similarities between images is adopted as a similarity of the objects. More specifically, referring to FIG. 6, the image similarity is determined on all combinations of the images of the objects, and a correspondence relationship of the images providing the maximum sum of the similarities is determined.

Figure 6:
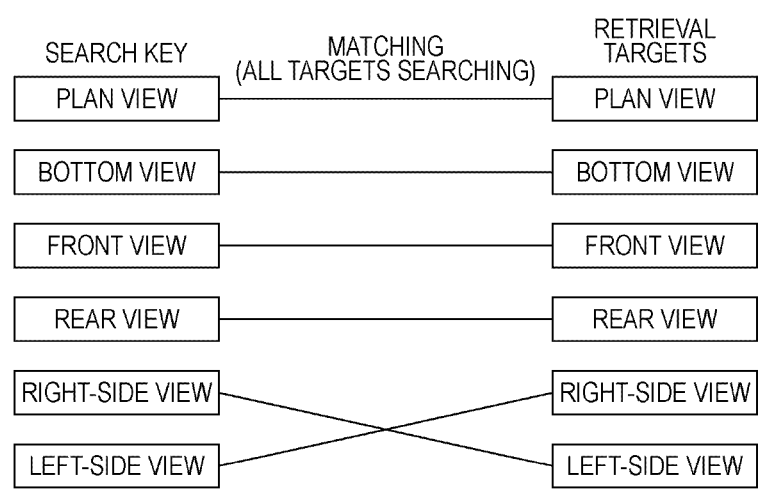
FIG. 6 illustrates an example of correspondence relationship of images as objects for use in retrieval.

FIG. 6 illustrates the correspondence relationship of the images of the objects used in retrieval. Referring to FIG. 6, six images depicted in multiple (six) directions (plan view, bottom view, front view, rear view, right-side view, and left-side view) are used for one object. Corresponding images of the objects are line connected to each other in FIG. 6.

As illustrated in FIG. 6, for example, the right-side view of the object as the search key corresponds to the left-side view of the object as the retrieval target. The left-side view of the object as the search key corresponds to the right-side view of the object as the retrieval target. In this and other examples, the similarity calculating unit 23 calculates the mean value of the similarities between the six pairs of lined-connected images, and thus sets the mean value as the similarity of the objects.

In a second method of determining the similarity between the objects, the maximum one of the similarities between the corresponding images of the objects is set to be the similarity of the objects. Referring to FIG. 6, the similarities between the images in all combinations of the images are determined and the correspondence relationship of the images providing the maximum sum of similarities is determined. In this and other examples, the similarity calculating unit 23 sets to be the similarity between the objects the maximum one of the similarities between the line-connected images in the six pairs.

Figure 7:
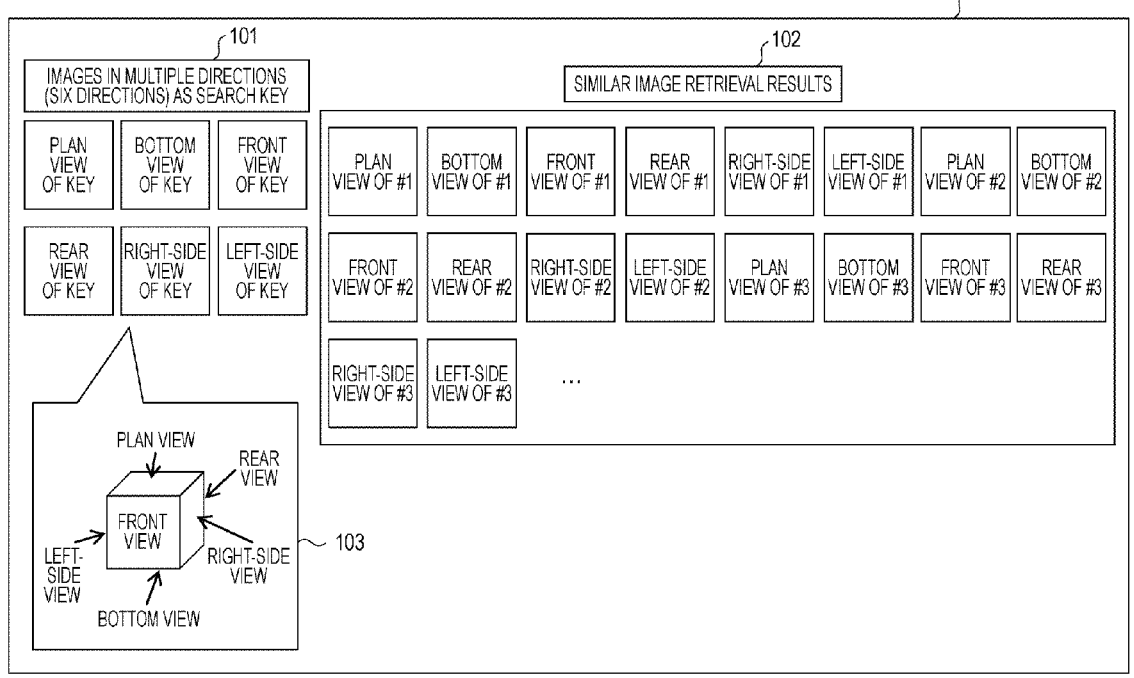
FIG. 7 illustrates a screen image of retrieval results.

As illustrated in FIG. 7, the retrieval result display unit 24 arranges, as the retrieval results, the images of the object as the retrieval target similar to the object as the search key in the order of similarity, and displays the images of the object as the retrieval target together with the images of the object as the search key. Accordingly, the retrieval result display unit 24 is an example of a retrieval result displaying means for displaying, on an output device, as retrieval results the images of an image group mapped to the object as the retrieval target in the order of similarity of the object as the retrieval target based on the similarity calculated by the similarity calculating unit.

FIG. 7 illustrates a screen image representing the retrieval results. The retrieval result display unit 24 displays a retrieval result display screen 100 as illustrated in FIG. 7. The retrieval result display screen 100 includes six images of an object 103 (such as an industrial design of a cell phone, for example) as a search key (illustrated at element 101) depicted in six directions (plan view, bottom view, front view, rear view, right-side view, and left-side view), and similar image retrieval results 102 in which images (plan view, bottom view, front view, rear view, right-side view, and left-side view) of objects as retrieval targets similar to the object 103 as the search key are arranged in the order of similarity.

Referring to FIG. 7, the retrieval result display unit 24 displays the images of the objects as the retrieval targets that are similar to the object 103 as the search key in the order of the plan view, the bottom view, the front view, the rear view, the right-side view, and the left-side view on the retrieval result display screen 100. In this case, the images of the objects as the retrieval targets that are similar to the object 103 as the search key are rearranged and displayed based on the correspondence relationship of the images maximizing the sum of the similarities.

Figure 8:
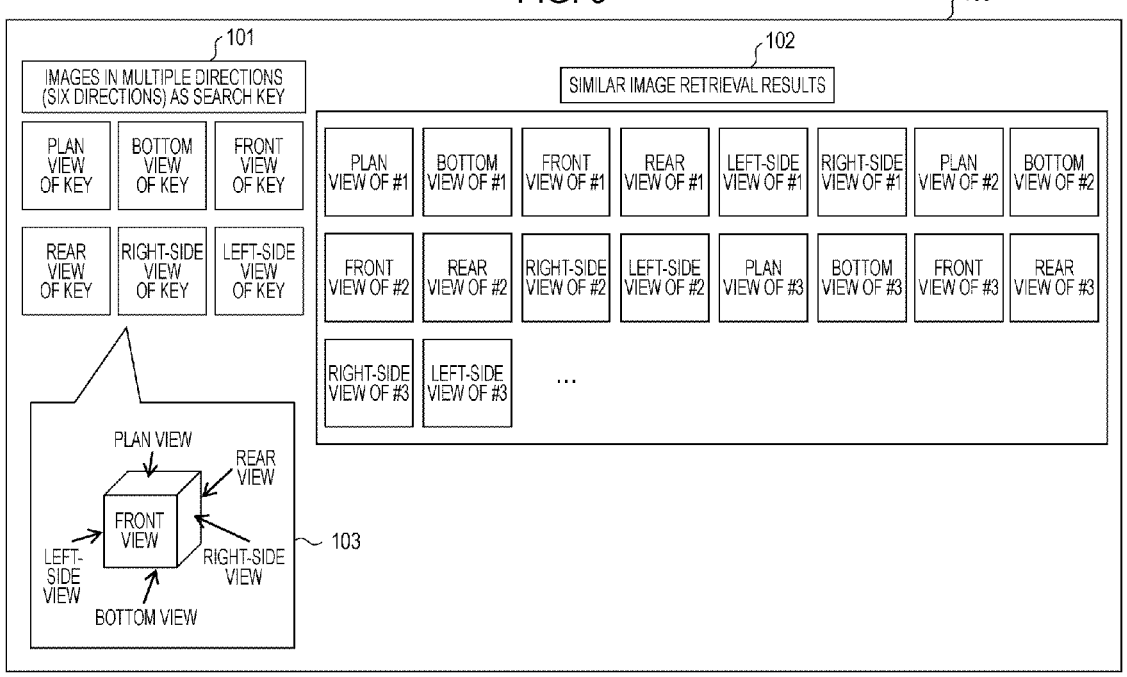
FIG. 8 illustrates another screen image of retrieval results.

FIG. 8 illustrates another screen image of the retrieval results. In the case of FIG. 6, the right-side view of the object 103 as the search key corresponds to the left-side view of the object as the retrieval target. The left-side view of the object as the search key corresponds to the right-side view of the object as the retrieval target. Referring to FIG. 8, the retrieval result display unit 24 rearranges a "left-side view of #1" and a "right-side view of #1" on the similar image retrieval results 102 and displays the re-arranged views on the retrieval result display screen 100.

The retrieval result represented in a cubic diagram may be more intelligible to the user than the retrieval result represented in the six-pane views on the retrieval result display screen 100 of FIGS. 7 and 8. For instance, as illustrated in FIG. 9, the retrieval result display unit 24 can display, in a cubic diagram on a retrieval result display screen 110, images of an object 113 as a search key 111 and images of objects 114-118 as retrieval targets that are similar to the object 113 as the search key.

Figure 9:
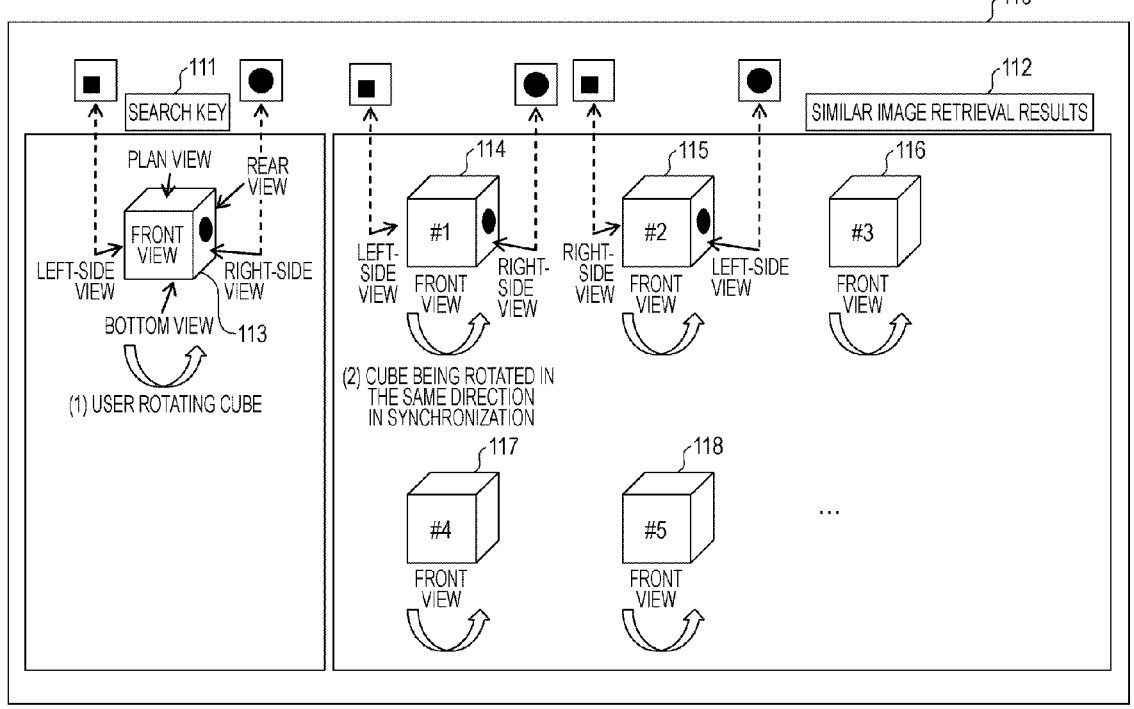
FIG. 9 illustrates a screen image of retrieval results displayed on a cubic diagram.

FIG. 9 illustrates an example of screen image representing the retrieval results in cubic diagrams. The retrieval result display unit 24 displays the object 113 as a search key 111 in a cubic diagram while also displaying, in a cubic diagram on the retrieval result display screen 110, similar image retrieval results 112 including objects 114-118 as the retrieval targets that are similar to the object 113 as the search key 111. The retrieval result display unit 24 displays various planar images of the objects 113-118 as cubes in a virtual three-dimensional space in the example of FIG. 9. The retrieval result display unit 24 produces cubic diagrams of the objects 113-118 by displaying the six images for each object 113-118 on the respective sides of each corresponding cube. In the cubic diagrams of the objects 113-118, the object 113 as the search key 111 and the objects 114-118 as the retrieval targets that are similar to the object 113 as the search key 111 may be produced by different creators and thus depicted as images oriented in different directions.

The retrieval result display unit 24 may rearrange the images of the objects 114-118 as the retrieval targets that are similar to the object 113 as the search key 111 based on the correspondence relationship of the images maximizing the sum of the similarities illustrated in FIG. 6. The retrieval result display unit 24 then displays the rearranged images of the objects 114-118 on the retrieval result display screen 110.

Referring to FIG. 9, the right-side view of the object 113 as the search key 111 corresponds to the left-side view of the object 115 as a retrieval target. The left-side view of the object 113 as the search key 111 corresponds to the right-side view of the object 115 as the retrieval target. The retrieval result display unit 24 thus rearranges the "left-side view of #2" and the "right-side view of #2" on the similar image retrieval results 112 in reverse order and then displays the rearranged images on the retrieval result display screen 110 as depicted in FIG. 9.

The object 115 on the similar image retrieval results 112 illustrated in FIG. 9 is depicted in a laterally reversed position with respect to the object 113 as the search key 111. The retrieval result display unit 24 thus interchanges the right-side view of the object 115 as the retrieval target with the left-side view of the object 115 as the retrieval target in accordance with the image similarity to comply with the object 113 as the search key 111. The retrieval result display unit 24 then displays the rearranged images so that the images having a higher similarity are arranged on the same sides.

In some embodiments, the retrieval result display unit 24 can then change the orientation relationship of the cube on the retrieval result display screen 110 in response to a user's manual operation. The retrieval result display unit 24 can also display the image displayed on the front (such as the front view) in a front-down fashion on the objects 114-118 on the similar image retrieval results 112.

When the user rotates the object 113 as the search key 111 on the retrieval result display screen 110, the retrieval result display unit 24 allows the objects 114-118 to rotate on the similar image retrieval results 112 in synchronization with and in the same direction as the object 113 as the search key 111. The user can freely rotate the object 113 as the search key 111 and the objects 114-118 on the similar image retrieval results 112 and verify the rotation results.

In order to display the retrieval result display screen 110 as illustrated in FIG. 9, the retrieval result display unit 24 represents by polyhedrons the object 113 as the search key 111 and the objects 114-118 as the retrieval targets in the order of similarity, and attaches and displays the images on the respective sides of the polyhedrons in correspondence to the object 113 as the search key 111. If an image orientation label is attached as attribute information to each image, the retrieval result display unit 24 displays the image orientation labels of images in front (such as a front view) just below the respective object 113 as the search key 111 and respective objects 114-118 as the retrieval targets.

Figure 10:
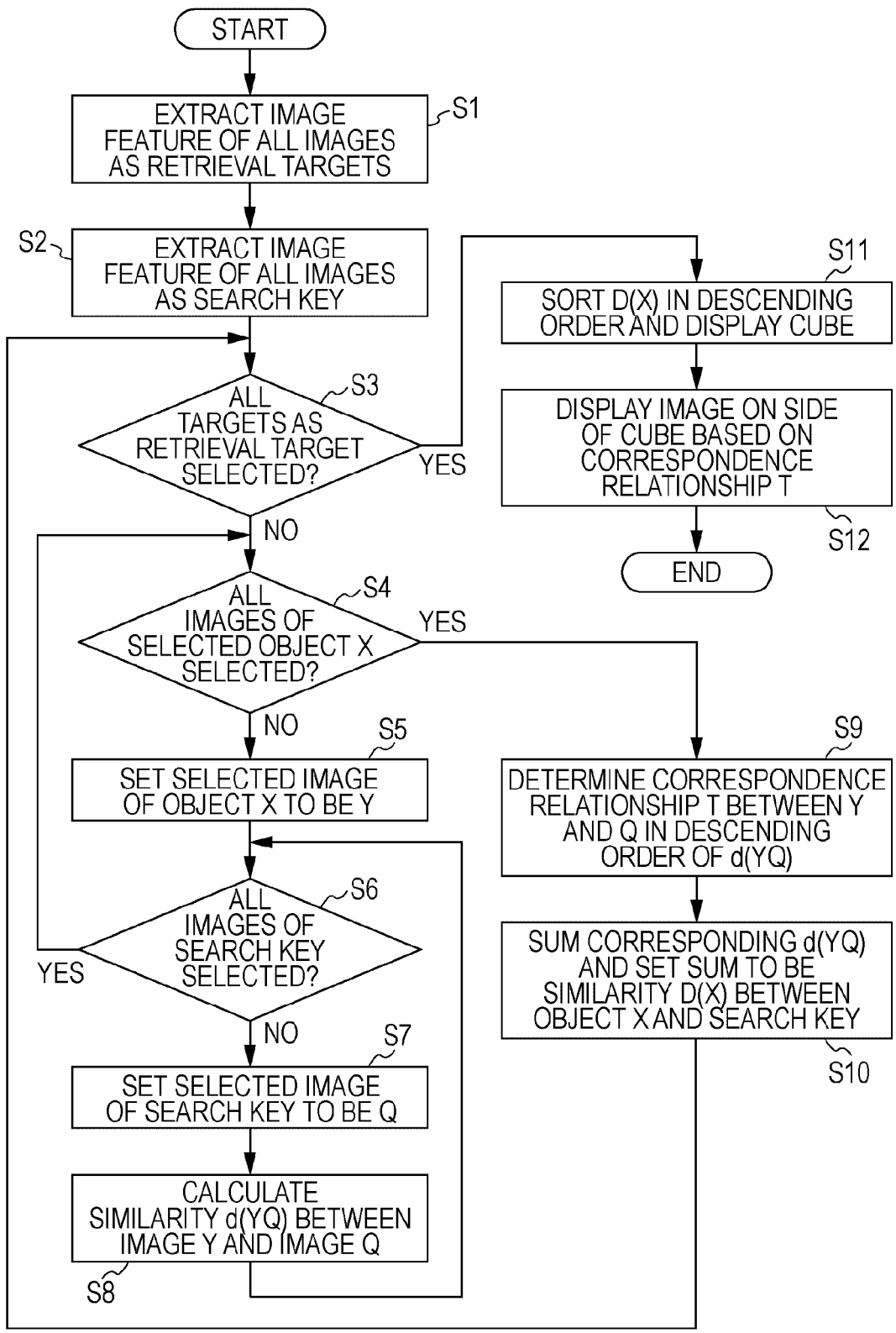
FIG. 10 is a flowchart illustrating a process of the design image retrieval apparatus.
Figure 11:
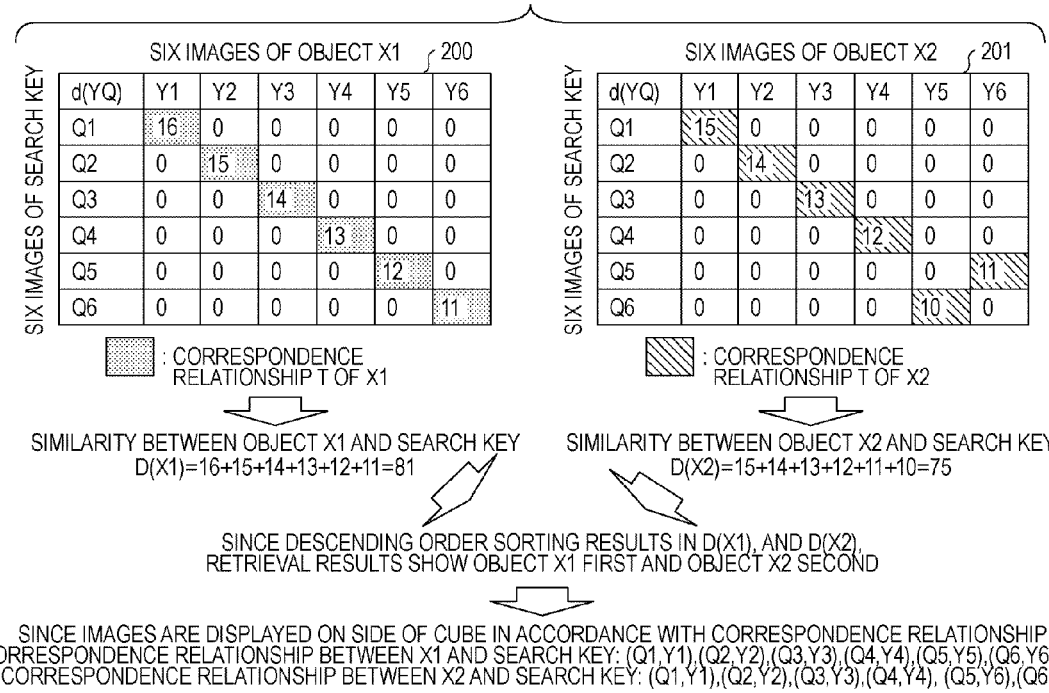
FIG. 11 illustrates a process of the design image retrieval apparatus.

A process of the design image retrieval apparatus 1 is described below with reference to a flowchart of FIG. 10 and a process chart of FIG. 11. FIG. 10 is the flowchart illustrating the process of the design image retrieval apparatus 1. FIG. 11 is the process chart illustrating the process of the design image retrieval apparatus 1.

The objects as the retrieval targets are two (X1,X2) in the example of FIG. 10 and FIG. 11. Each object X1, X2 corresponds to six images in six orientation directions. Each object X1, X2 is represented by a cube (hexahedron), and an image is attached to each side of the cube.

In step S1, the image feature quantity extraction unit 22 extracts the image feature quantities of all images of the object as a retrieval target, and stores the extracted image feature quantities onto the storage unit 34.

In step S2, the image feature quantity extraction unit 21 extracts the image feature quantities of all images of the object as a search key, and stores the extracted image feature quantities onto the storage unit 33.

In step S3, the similarity calculating unit 23 determines whether all the objects as the retrieval targets on the storage unit 34 have been selected. If objects as retrieval targets remain to be selected on the storage unit 34, the similarity calculating unit 23 selects the object X1 from the unselected objects as the retrieval targets on the storage unit 34, and proceeds to step S4. If it is determined in step S3 that all the objects as the retrieval targets have been selected on the storage unit 34, processing proceeds to step S11.

In step S4, the similarity calculating unit 23 determines whether all the images of the object X1 selected in step S3 have been selected. If there remain images of the object X1 to be selected, the similarity calculating unit 23 selects an unselected image of the object X1, and proceeds to step S5. If it is determined in step S4 that all the images have been selected, processing proceeds to step S9.

In step S5, the similarity calculating unit 23 sets the image of the object X1 selected in step S4 to be Y1. Processing proceeds to step S6. The similarity calculating unit 23 determines whether all the images of the object as the search key have been selected. If any image of the object as the search key remains to be selected, the similarity calculating unit 23 selects the unselected image of the object as the search key, and processing proceeds to step S7. If all the images of the object as the search key have been selected, processing returns to step S4.

In step S7, the similarity calculating unit 23 sets the image of the object as the search key selected in step S6 (selected image of the search key) to be Q1. The image Q1 has an image orientation as a plan view. Image Q2-Q6 to be described hereinbelow have image orientations as a bottom view, a front view, a rear view, a right-side view, and a left-side view, respectively. Similarly, images Y1-Y6 to be described hereinbelow have image orientations as a plan view, a bottom view, a front view, a rear view, a right-side view, and a left-side view, respectively.

In step S8, the similarity calculating unit 23 calculates a similarity d(Y1,Q1) between the image Y1 of the object X1 and the selected image Q1 of the search key, based on the image feature quantity of the image Y1 extracted in step S1 and the image feature quantity of the selected image Q1 extracted in step S2 as previously described.

The similarity calculating unit 23 repeats steps S6-S8 until the similarity calculating unit 23 determines that all the images of the object as the search key have been selected. The similarity calculating unit 23 thus calculates similarities d(Y1,Q2)–d(Y1,Q6) between the image Y1 of the object X1 and each of the selected images Q2-Q6 of the search key.

If it is determined that all the images of the object as the search key have been selected, the similarity calculating unit 23 returns from step S6 to step S4. The similarity calculating unit 23 repeats steps S4-S8 until the similarity calculating unit 23 determines that all the images of the object X1 selected in step S3 have been selected. The similarity calculating unit 23 thus calculates similarities d(Y2,Q1)–d(Y6, Q6) between each of the images Y2-Y6 of the object X1 and each of the selected images Q1-Q6 of the search key.

Through the process performed heretofore, the similarity calculating unit 23 can produce a table 200 as illustrated in FIG. 11. If it is determined that all the images of the object X1 selected in step S3 have been selected, the similarity calculating unit 23 proceeds from step S4 to step S9. Using the table 200, the similarity calculating unit 23 determines a correspondence relationship T of the images Y1-Y6 of the object X1 and the selected images Q1-Q6 of the search key in the descending order of similarity d(YQ).

The similarity calculating unit 23 determines the correspondence relationship T based on the table 200. In the correspondence relationship T, the selected image Q1 of the search key corresponds to the image Y1 of the object X1, the selected image Q2 of the search key corresponds to the image Y2 of the object X1, the selected image Q3 of the search key corresponds to the image Y3 of the object X1, the selected image Q4 of the search key corresponds to the image Y4 of the object X1, the selected image Q5 of the search key corresponds to the image Y5 of the object X1, and the selected image Q6 of the search key corresponds to the image Y6 of the object X1.

In step S10, the similarity calculating unit 23 determines the sum of the similarities d(YQ) mapped by the correspondence relationship T, and sets the sum to be a similarity D(X1) between the object X1 and the object of the search key. In the table 200 of FIG. 11, the similarity D(X1) is 81.

Processing returns from step S10 to step S3 as depicted in FIG. 10. The similarity calculating unit 23 determines whether all the objects as the retrieval targets on the storage unit 34 have been selected. In the embodiment, there remains an object as a retrieval target on the storage unit 34, and the similarity calculating unit 23 selects an unselected object X2 as a retrieval target on the storage unit 34.

The similarity calculating unit 23 performs steps S4-S8 on the object X2 as a retrieval target, thereby producing a table 201 as illustrated in FIG. 11. If it is determined that all the images of the object X2 selected in S3 have been selected, the similarity calculating unit 23 proceeds from step S4 to step S9. Using the table 201, the similarity calculating unit 23 determines a correspondence relationship T between each of the images Y1-Y6 of the object X2 and each of the selected images Y1-Y6 of the retrieval keys in the descending order of similarity d(YQ).

The similarity calculating unit 23 determines the correspondence relationship T based on the table 201. In the correspondence relationship T, the selected image Q1 of the search key corresponds to the image Y1 of the object X2, the selected image Q2 of the search key corresponds to the image Y2 of the object X2, the selected image Q3 of the search key corresponds to the image Y3 of the object X2, the selected image Q4 of the search key corresponds to the image Y4 of the object X2, the selected image Q5 of the search key corresponds to the image Y6 of the object X2, and the selected image Q6 of the search key corresponds to the image Y5 of the object X2.

In step S10, the similarity calculating unit 23 determines the sum of the similarities d(YQ) mapped by the correspondence relationship T, and sets the sum to be a similarity D(X2) between the object X2 and the object of the search key. In the table 201 of FIG. 11, the similarity D(X2) is 75.

Processing returns from step S10 to step S3 as depicted in FIG. 10. The similarity calculating unit 23 determines whether all the objects as the retrieval targets on the storage unit 34 have been selected. In the embodiment, all the objects as the retrieval targets on the storage unit 34 have been selected. The similarity calculating unit 23 proceeds to step S11 and requests the retrieval result display unit 24 to display the retrieval results. The retrieval result display unit 24 sorts the similarities D(X1) and D(X2) in the descending order.

The retrieval result display unit 24 sorts the similarities D(X1) and D(X2) in the descending order, namely, in the order of similarity D(X1) and D(X2). In this example, the object X1 is displayed first, and the object X2 is displayed second since D(X1) is greater than D(X2).

Processing proceeds to step S12. The retrieval result display unit 24 displays the six images (images Y1-Y6) of each of the objects X1 and X2 on the respective sides of the cubes in accordance with the object X1 and the search key, the object X2 and the search key, and the respective correspondence relationships T. When the six images (images Y1-Y6) of each of the objects X1 and X2 are displayed on the respective sides of the cubes in accordance with the correspondence relationships T, the retrieval result display unit 24 determines which side of the cube each of the six images is to be displayed on based on the image orientation of the images Q1-Q6 and the correspondence relationship T. For example, as illustrated in FIG. 11, the retrieval result display unit 24 displays the images with the image Y5 of the object X2 interchanged with the image Y6 of the object X2.

When the images Y1-Y6 of the object X1 as the retrieval targets are displayed on the respective sides of the cube, one of the images Y1-Y6 most similar to the images Q1-Q6 as the search key is attached to the side in the same orientation as the corresponding one of the images Q1-Q6 as the search key.

The cube corresponding to the object X1 is rotated so that the similar image is attached to the same side on the cube as the corresponding one of the images Q1-Q6 of the search key. The retrieval result display unit 24 then attaches the image second most similar to a corresponding one of the images Q1-Q6 as the search key on the side of the cube in the same orientation as the corresponding one of the images Q1-Q6. If the image cannot be attached to the side in the same orientation as the corresponding one of the images Q1-Q6 as the search key because of the limitation of the cube, the retrieval result display unit 24 skips that step without attaching the image on the corresponding side. Similarly, the retrieval result display unit 24 then attaches the images third to sixth most similar to the corresponding ones of the images Q1-Q6 as the search key on the side of the cube in the same orientations as the corresponding ones of the images Q1-Q6.

For example, the most similar image may be the image on the front view of the cube, and a side similar to the images Q1-Q6 as the search key may also be the front view of the cube. In such a case, the retrieval result display unit 24 attaches the first most similar image on the front of the cube.

The second most similar image may be the image on the rear of the cube, and a side similar to the images Q1-Q6 as the search key may be the left-side view of the cube. In such a case, the retrieval result display unit 24 rotates the cube with the image attached first on the front of the cube, and determines whether the second most similar image can be attached on the left side of the cube. It is assumed here that the second most similar image cannot be attached on the left side. The retrieval result display unit 24 thus skips this step without attaching the second most similar image.

The retrieval result display unit 24 thus repeats the same process as the process performed on the first and second most similar images in order of the third, fourth, fifth, and sixth most similar images to the images Q1-Q6 as the search key. If an image not yet attached onto any side of the cube remains subsequent to the attaching of the sixth most similar image, the retrieval result display unit 24 determines, for the image not yet attached onto any side of the cube, a side on which the image is to be attached within the range satisfying the rotation limitation of the cube.

The retrieval result display unit 24 may display the retrieval result on one of the retrieval result display screens illustrated in FIGS. 12-17 in addition to or instead of the retrieval result display screen 110 of FIG. 9.

Figure 12:
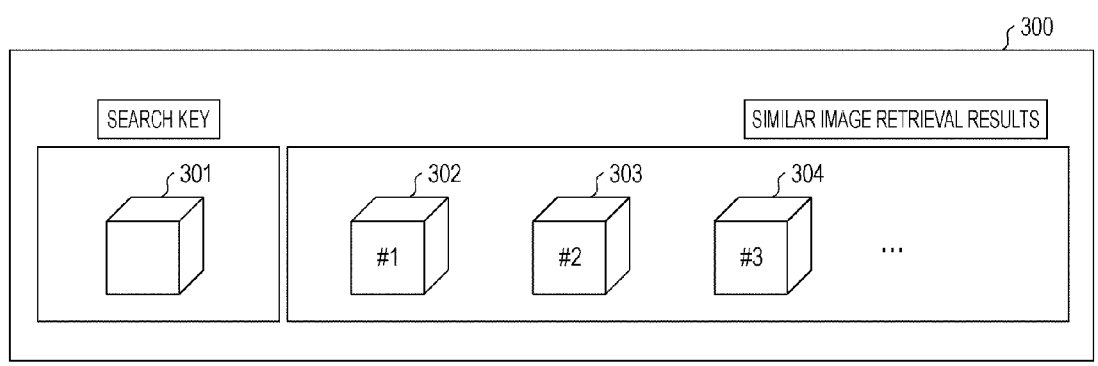
FIG. 12 illustrates a screen image of retrieval results displayed on a cubic diagram.

FIG. 12 illustrates a retrieval result display screen 300 based on a cubic diagram. In the example of FIG. 12, the retrieval result display unit 24 determines one of the six images of each of the objects 302-304 as retrieval targets, which is most similar to an object 301 as a search key, on each of the objects 302-304. The retrieval result display unit 24 then displays the objects 302-304 as the retrieval targets on the cubic diagrams on a retrieval result display screen 300 in the order of from greatest to least similarity.

Figure 13:
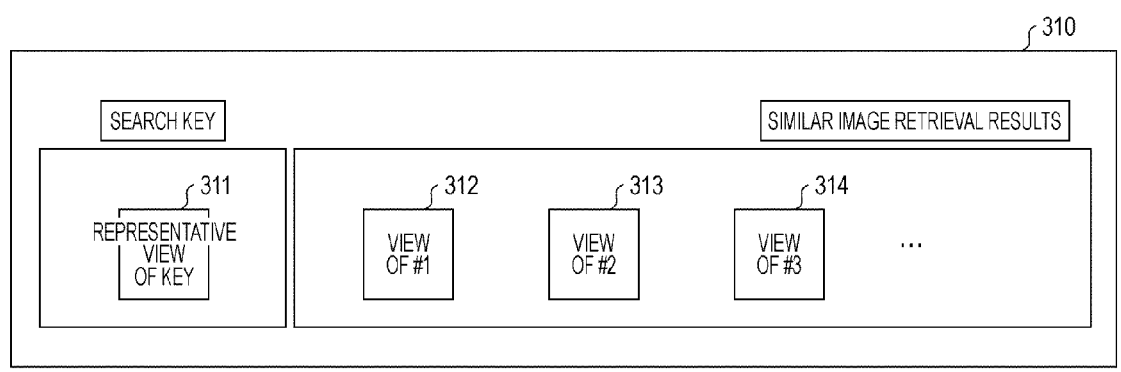
FIG. 13 illustrates a screen image of retrieval results displayed on a plan view.

FIG. 13 illustrates another retrieval result display screen 310. In the example of FIG. 13, the retrieval result display unit 24 determines one of the six images of each of the objects 312-314 as retrieval targets, which is most similar to an object 311 as a search key, on each of the objects 312-314. The retrieval result display unit 24 then displays the determined images having greater similarity in planar views on a retrieval result display screen 310.

Figure 14:
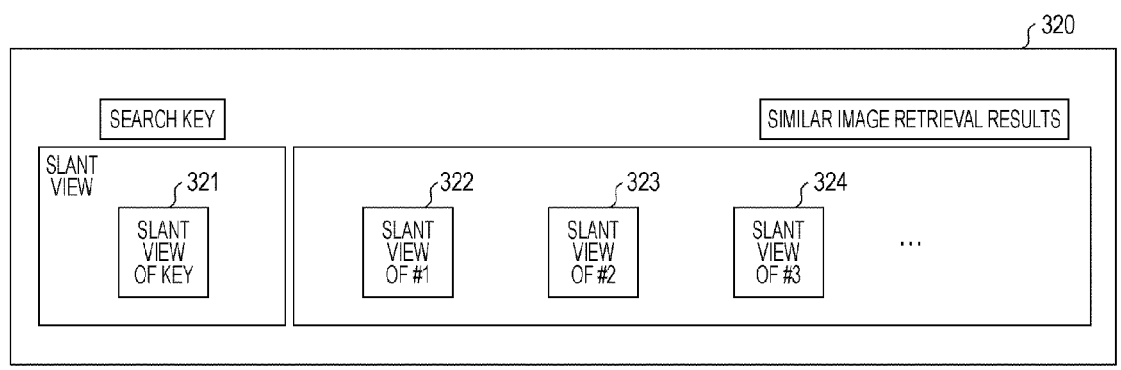
FIG. 14 illustrates a screen image of retrieval results displayed on a representative view.

FIG. 14 illustrates a retrieval result display screen 320 based on a representative view. The retrieval result display unit 24 displays representative views 322-324 of each object as a retrieval target (for example, images depicted at a slant angle to the object as the retrieval target) on a retrieval result display screen 320 in the order of similarity with an object 321 as a search key.

Figure 15:
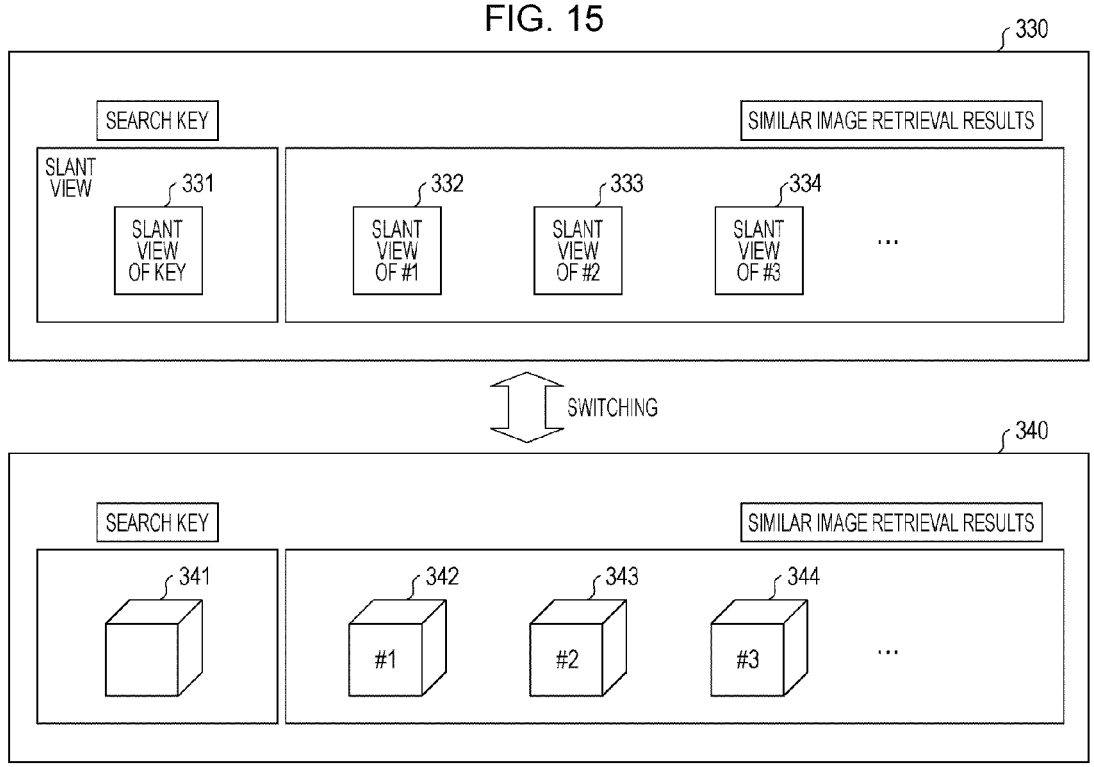
FIG. 15 illustrates a screen image representing retrieval results in which display switching is performed between the representative view and the cubic view.

FIG. 15 illustrates a retrieval result display screen with a switching operation performed to switch between a representative view and a cubic diagram. In the example of FIG. 15, the retrieval result display unit 24 displays representative views 332-334 of an object as a retrieval target on a retrieval result display screen 330 in the order of similarity with an object 331 as a search key. The retrieval result display unit 24 can also display the representative views 332-334 of the object as the retrieval target in cubic diagrams 342-344 on a retrieval result display screen 340 in the order of similarity with an object 341 as a search key. The user selects the retrieval result display screen 330 or the retrieval result display screen 340 by specifying whichever retrieval result display screen 330 or 340 is desired.

Figure 16:
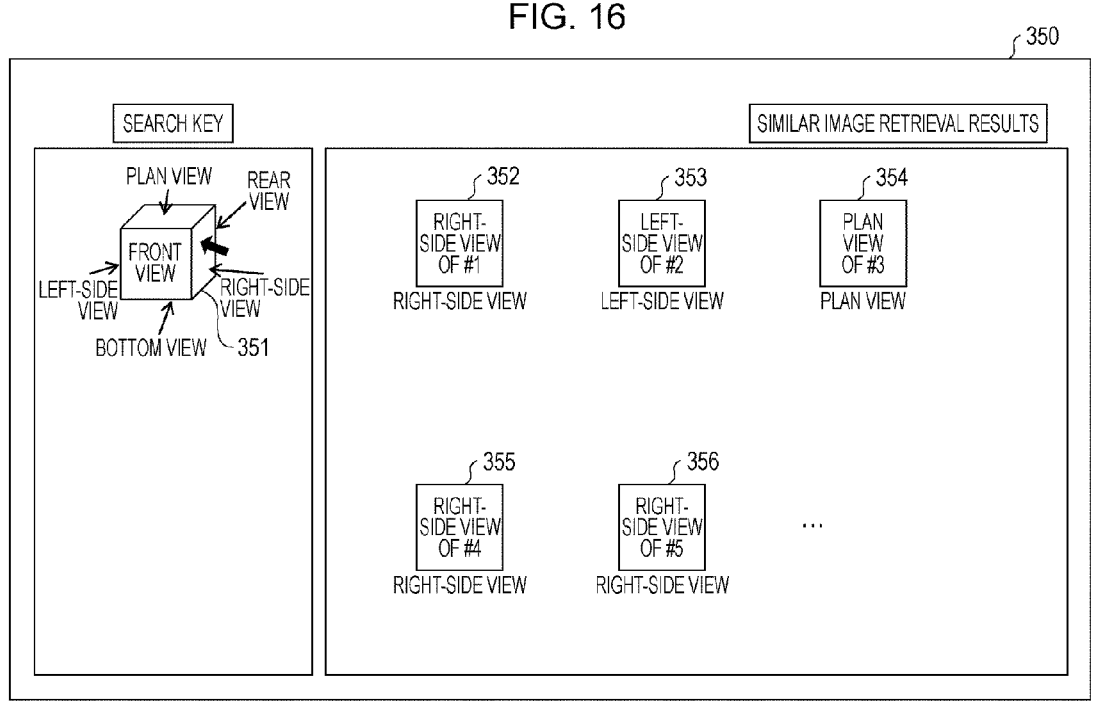
FIG. 16 illustrates a screen image of retrieval results in which an image on a side specified by a search key is displayed.

FIG. 16 illustrates a retrieval result display screen 350 displaying an image on a side specified on the search key. The side of the cube of an object 351 as a search key is specified when the retrieval result display unit 24 displays objects 352-356 as retrieval targets in the order of similarity with the object 351 as the search key. The images of the objects 352-356 corresponding to (i.e., similar to) the specified side are thus displayed on a retrieval result display screen 350 in the order of similarity.

When the objects 352-356 as the retrieval targets are displayed in the order of similarity with the object 351 as the search key, the user may manually modify the orientation of each of the objects 352-356, as appropriate, or change the side on which the image is attached, as appropriate.

Figure 17:
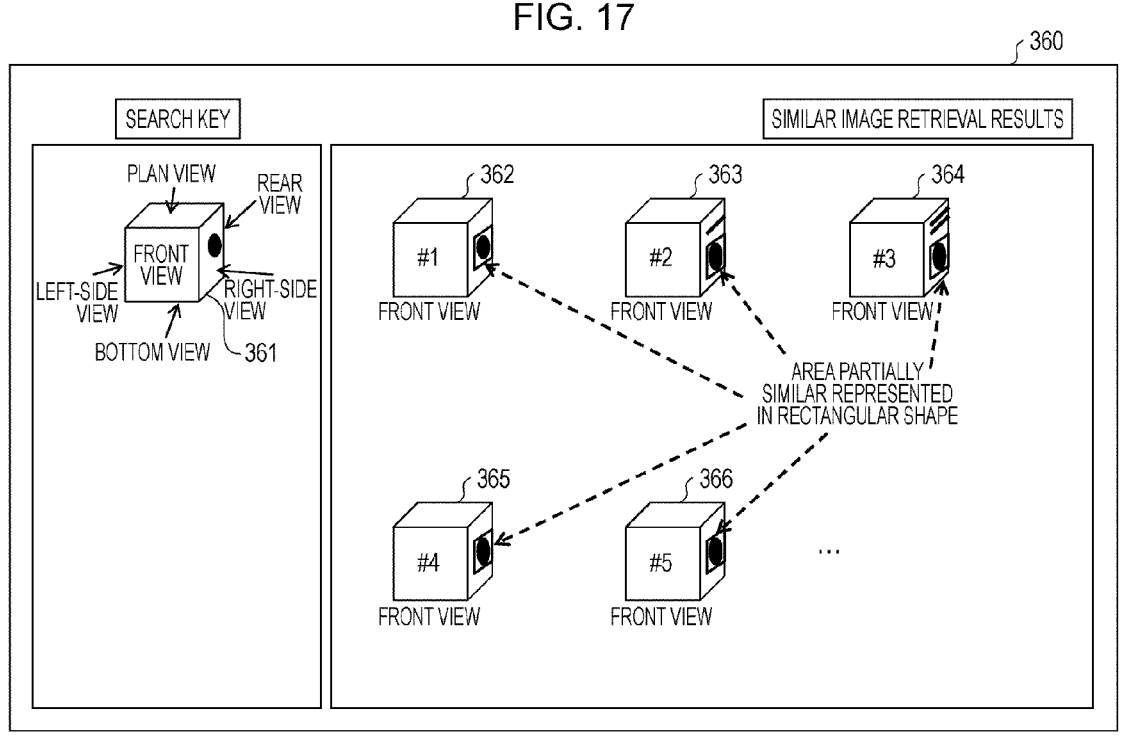
FIG. 17 illustrates a screen image of retrieval results in which portions partially similar are marked by rectangular shapes.

FIG. 17 illustrates a retrieval result display screen 360 on which partially similar portions are marked in rectangular boxes. In this example, the similarity calculating unit 23 calculates as an image similarity the degree of partial similarity with an image of an object 361 as a search key. The retrieval result display unit 24 attaches and displays the images of objects 362-366 as retrieval targets on cubes. In this case, the retrieval result display unit 24 marks by a rectangular box a portion of each image of the objects 362-366 as the retrieval targets partially similar to the image of the object 361 as the search key.

In accordance with embodiments described herein, one object is displayed in a plurality of images, and retrieval results are displayed in the order of similarity. The design image retrieval apparatus 1 according to embodiments described herein displays the image as the search key with the image of the object as the retrieval target corresponding thereto. The images having a higher similarity are displayed on the same side in the same orientation.

The design image retrieval apparatus 1 of the embodiment also displays the image as the search key and the image of the object as the retrieval target so that the images having higher similarities are placed on the sides in the same orientation in order. The user can thus verify easily the retrieval results.

Embodiments discussed herein may relate to the use of a computer including various computer hardware or software units. Embodiments also include computer-readable storage media that store programs for causing computers to perform processes discussed herein. The computer-readable storage media can be any available or suitable media that can be accessed by a computer. For example, such computer-readable storage media can include RAM, ROM, EEPROM, CD-ROM or other optical disk storage, magnetic disk storage or other magnetic storage devices, solid-state devices, or any other storage medium which can be used to carry or store desired program code in the form of computer-executable instructions or data structures and can be accessed by a computer.

Programs and computer-executable instructions include, for example, instructions and data which cause a general-purpose computer, special-purpose computer, or special purpose processing device to perform a function or group of functions. A computer, as used herein, can include one or more computers or processors that may be local, remote or distributed with respect to one another, or can include computer or processor subsystems.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image retrieval method of a computer for retrieving similar objects, comprising:
   reading from a first database a plurality of images of an image group mapped to a multidimensional object as a retrieval target, and extracting an image feature quantity of the read plurality of images, the first database storing the plurality of images depicting the multidimensional object as the retrieval target from a plurality of orthoprojection viewpoints of the multidimensional object in different directions;

reading from a second database a plurality of images of an image group mapped to a multidimensional object as a search key, and extracting an image feature quantity of the read plurality of images, the second database storing the plurality of images depicting the multi-dimensional object as the search key from a plurality of orthoprojection viewpoints in different directions;

determining a similarity between the image group mapped to the multidimensional object as the search key and the image group mapped to the multidimensional object as the retrieval target, based on the image feature quantity of the plurality of images of the image group mapped to the multidimensional object as the retrieval target and the image feature quantity of the plurality of images of the image group mapped to the multidimensional object as the search key; and displaying, on an output device, as retrieval results the plurality of images of the image group mapped to the multidimensional object as the retrieval target in an order of similarity of the multidimensional object as the retrieval target based on the determined similarity, wherein the retrieval results are presented by displaying the multidimensional object as the search key in a cubic diagram using the plurality of images of the multidimensional object as the search key, and by displaying the multidimensional object as the retrieval target in another cubic diagram using the plurality of images of the multidimensional object as the retrieval target.

2. The image retrieval method according to claim 1, wherein the retrieval results are presented by determining a correspondence relationship representing a similarity between an image resulting from depicting the multidimensional object as the search key from one orthoprojection viewpoint in one direction and an image resulting from depicting the multidimensional object as the retrieval target from another orthoprojection viewpoint in another direction, based on the image feature quantity of the plurality of images of the image group mapped to the multidimensional object as the retrieval target and the image feature quantity of the plurality of images of the image group mapped to the multidimensional object as the search key, and by rearranging and displaying the plurality of images of the multidimensional object as the retrieval target in accordance with the correspondence relationship so that the plurality of images of the multidimensional object as the retrieval target are similar to the plurality of images of the multidimensional object as the search key.

3. The image retrieval method according to claim 1, wherein the cubic diagram of the multidimensional object as the retrieval target is configured to be rotated in synchronization with and in the same direction as the cubic diagram of the multidimensional object as the search key.

4. The image retrieval method according to claim 1, wherein in order to determine the similarity between the image group mapped to the multidimensional object as the search key and the image group mapped to the multidimensional object as the retrieval target, all combinations of each of the images of the image group mapped to the multidimensional object as the search key and each of the images of the image group mapped to the multidimensional object as the retrieval target are calculated in terms of similarity, a correspondence relationship of the images providing the maximum sum of the similarities is determined, and the mean value of the similarities of the images in the correspondence relationship providing the maximum sum of the similarities is set to be a similarity between the multidimensional object as the retrieval target and the multidimensional object as the search key.

5. The image retrieval method according to claim 1, wherein in order to determine the similarity between the image group mapped to the multidimensional object as the search key and the image group mapped to the multidimensional object as the retrieval target, all combinations of each of the images of the image group mapped to the multidimensional object as the search key and each of the images of the image group mapped to the multidimensional object as the retrieval target are calculated in terms of similarity, a correspondence relationship of the images providing the maximum sum of the similarities is determined, and the maximum similarity of the images in the correspondence relationship providing the maximum sum of the similarities is set to be a similarity between the multidimensional object as the retrieval target and the multidimensional object as the search key.

6. An image retrieval apparatus, comprising:
a memory; and
a processor that executes a procedure in the memory, the procedure including:
   a first image feature extracting process configured to read from a first database a plurality of images of an image group mapped to a multidimensional object as a retrieval target, and extracting an image feature quantity of the read plurality of images, the first database storing the plurality of images depicting the multi-dimensional object as the retrieval target from a plurality of orthoprojection viewpoints in different directions;
   a second image feature extracting process configured to read from a second database a plurality of images of an image group mapped to a multi-dimensional object as a search key, and extracting an image feature quantity of the read plurality of images, the second database storing the plurality of images depicting the multi-dimensional object as the search key from a plurality of orthoprojection viewpoints in different directions;
   a similarity calculating process configured to calculate a similarity between the image group mapped to the multidimensional object as the search key and the image group mapped to the multidimensional object as the retrieval target, based on the image feature quantity of the multidimensional object as the retrieval target and the image feature quantity of the multidimensional object as the search key; and
   a retrieval result displaying process configured to display, on an output device, as retrieval results the plurality of images of the image group mapped to the multidimensional object as the retrieval target in the order of similarity of the multidimensional object as the retrieval target based on the similarity,
   wherein the retrieval results are presented by displaying the multidimensional object as the search key in a cubic diagram using the plurality of images of the multidimensional object as the search key, and by displaying the multidimensional object as the retrieval target in another cubic diagram using the plurality of images of the multidimensional object as the retrieval target.

7. The image retrieval apparatus according to claim 6, wherein the retrieval result displaying process determines a correspondence relationship representing a similarity between an image resulting from depicting the multidimensional object as the search key from one orthoprojection viewpoint in one direction and an image resulting from depicting the multidimensional object as the retrieval target from another orthoprojection viewpoint in another direction, based on the image feature quantity of the plurality of images of the image group mapped to the multidimensional object as the retrieval target and the image feature quantity of the plurality of images of the image group mapped to the multidimensional object as the search key, and rearranges and displays the plurality of images of the multidimensional object as the retrieval target in accordance with the correspondence relationship so that the plurality of images of the multidimensional object as the retrieval target are similar to the plurality of images of the multidimensional object as the search key.

8. The image retrieval apparatus according to claim 6, wherein the retrieval result display process is configured to rotate the cubic diagram of the multidimensional object as the retrieval target in synchronization with and in the same direction as the cubic diagram of the multidimensional object as the search key.

9. The image retrieval apparatus according to claim 6, wherein the similarity calculating process calculates similarities of all combinations of each of the images of the image group mapped to the multidimensional object as the search key and each of the images of the image group mapped to the multidimensional object as the retrieval target, determines a correspondence relationship of the images providing the maximum sum of the similarities, and sets the mean value of the similarities of the images in the correspondence relationship providing the maximum sum of the similarities to be a similarity between the multidimensional object as the retrieval target and the multidimensional object as the search key.

10. The image retrieval apparatus according to claim 6, wherein the similarity calculating process calculates similarities of all combinations of each of the images of the image group mapped to the multidimensional object as the search key and each of the images of the image group mapped to the multidimensional object as the retrieval target, determines a correspondence relationship of the images providing the maximum sum of the similarities, and sets the maximum similarity of the images in the correspondence relationship providing the maximum sum of the similarities to be a similarity between the multidimensional object as the retrieval target and the multidimensional object as the search key.

11. A non-transitory computer-readable storage medium that stores a program causing a computer to perform a process of retrieving similar multidimensional objects, the process comprising:
reading from a first database a plurality of images of an image group mapped to a multidimensional object as a retrieval target, and extracting an image feature quantity of the read plurality of images, the first database storing the plurality of images depicting the multi-dimensional object as the retrieval target from a plurality of orthoprojection viewpoints in different directions;
reading from a second database a plurality of images of an image group mapped to a multidimensional object as a search key, and extracting an image feature quantity of the read plurality of images, the second database storing the plurality of images depicting the multi-dimensional object as the search key from a plurality of orthoprojection viewpoints in different directions;
determining a similarity between the image group mapped to the multidimensional object as the search key and the image group mapped to the multidimensional object as the retrieval target, based on the image feature quantity of the plurality of images of the image group mapped to the multidimensional object as the retrieval target and the image feature quantity of the plurality of images of the image group mapped to the multidimensional object as the search key; and
displaying, on an output device, as retrieval results, the plurality of images of the image group mapped to the multidimensional object as the retrieval target in the order of similarity of the multidimensional object as the retrieval target based on the determined similarity,
wherein the retrieval results are presented by displaying the multidimensional object as the search key in a cubic diagram using the plurality of images of the multidimensional object as the search key, and by displaying the multidimensional object as the retrieval target in another cubic diagram using the plurality of images of the multidimensional object as the retrieval target.

12. The non-transitory computer-readable storage medium according to claim 11, wherein the retrieval results are presented by determining a correspondence relationship representing a similarity between an image resulting from depicting the multidimensional object as the search key from one orthoprojection viewpoint in one direction and an image resulting from depicting the multidimensional object as the retrieval target from another orthoprojection viewpoint in another direction, based on the image feature quantity of the plurality of images of the image group mapped to the multidimensional object as the retrieval target and the image feature quantity of the plurality of images of the image group mapped to the multidimensional object as the search key, and by rearranging and displaying the plurality of images of the multidimensional object as the retrieval target in accordance with the correspondence relationship so that the plurality of images of the multidimensional object as the retrieval target are similar to the plurality of images of the multidimensional object as the search key.

13. The non-transitory computer-readable storage medium according to claim 11, wherein the cubic diagram of the multidimensional object as the retrieval target is rotated in synchronization with and in the same direction as the cubic diagram of the multidimensional object as the search key.

14. The non-transitory computer-readable storage medium according to claim 11, wherein in order to determine the similarity between the image group mapped to the multidimensional object as the search key and the image group mapped to the multidimensional object as the retrieval target, all combinations of each of the images of the image group mapped to the multidimensional object as the search key and each of the images of the image group mapped to the multidimensional object as the retrieval target are calculated in terms of similarity, a correspondence relationship of the images providing the maximum sum of the similarities is determined, and the mean value of the similarities of the images in the correspondence relationship providing the maximum sum of the similarities is set to be a similarity between the multidimensional object as the retrieval target and the multidimensional object as the search key.

15. The non-transitory computer-readable storage medium according to claim 11, wherein in order to determine the similarity between the image group mapped to the multidimensional object as the search key and the image group mapped to the multidimensional object as the retrieval target, all combinations of each of the images of the image group mapped to the multidimensional object as the search key and each of the images of the image group mapped to the multidimensional object as the retrieval target are calculated in terms of similarity, a correspondence relationship of the images providing the maximum sum of the similarities is determined, and the maximum similarity of the images in the correspondence relationship providing the maximum sum of the similarities is set to be a similarity between the multidimensional object as the retrieval target and the multidimensional object as the search key.

* * * * *